United States Patent [19]
Brown

[11] Patent Number: 5,361,022
[45] Date of Patent: Nov. 1, 1994

[54] METHOD AND APPARATUS FOR ELECTRICAL DYNAMIC BRAKING

[75] Inventor: Michael E. Brown, Mason, Ohio

[73] Assignee: E. F. Bavis & Associates, Inc., Maineville, Ohio

[21] Appl. No.: 35,946

[22] Filed: Mar. 23, 1993

[51] Int. Cl.[5] ............................................. H02P 3/12
[52] U.S. Cl. ................................................... 318/375
[58] Field of Search ......................................... 318/375

[56] References Cited

U.S. PATENT DOCUMENTS

| | | | |
|---|---|---|---|
| 3,737,751 | 6/1973 | Lima | 318/375 |
| 3,786,329 | 1/1974 | Whited . | |
| 3,854,076 | 12/1974 | Lambert | 318/375 |
| 3,864,612 | 2/1975 | Whited . | |
| 3,876,920 | 4/1975 | Meissen et al. . | |
| 4,275,341 | 1/1981 | Huber et al. . | |
| 4,386,299 | 5/1983 | Pham . | |
| 4,396,877 | 8/1993 | Egri et al. . | |
| 4,568,864 | 2/1986 | Gisske | 318/375 |
| 4,672,277 | 6/1987 | Makinen et al. . | |
| 4,816,726 | 3/1989 | Novis et al. . | |
| 4,911,566 | 3/1990 | Imaseki et al. | 318/375 |
| 4,990,837 | 2/1991 | Ishitobi | 318/375 |

OTHER PUBLICATIONS

Technical data Sheet *Lattice Semiconductor Corporation*, *High Performan E²CMOS PLD Generic Array Logic ™*, Hillsboro, Oregon, Apr. 1991.

Primary Examiner—William M. Shoop, Jr.
Assistant Examiner—Karen Masih
Attorney, Agent, or Firm—Frost & Jacobs

[57] ABSTRACT

A dynamic braking circuit for use with bi-directional conveyor systems and other equipment having a soft start/hard stop capability in both directions of movement. The circuit electrically brakes the rotation of a DC motor by short-circuiting the armature of the motor, thereby creating a reverse current and reverse magnetic field to oppose the motor's rotation. The circuit uses high-voltage, high-current SCR's to switch the motor running current (in both directions) and to brake the motor as quickly as is possible for a braking circuit that uses such reverse current. The circuit thereby operates without the use of any in-series braking resistors or "smoothing" inductors which lower the magnitude of the reverse current. The SCR's are gated "on" in pairs per each half-cycle of the AC power supply, which enhances noise immunity of the overall SCR control circuit.

16 Claims, 4 Drawing Sheets

METHOD AND APPARATUS FOR ELECTRICAL DYNAMIC BRAKING

TECHNICAL FIELD

The present invention relates generally to dynamic braking equipment and is particularly directed to electrical circuits which control electric motors that provide the drive for transportable or movable devices. The invention is specifically disclosed as a reversible D.C. motor electrical circuit which controls a bidirectional conveyor system having a "soft" start and a "hard" stop capability.

BACKGROUND OF THE INVENTION

Various dynamic braking circuits have been used in the past for slowing and stopping equipment, such as elevators and conveyors, driven by electrical motors. Since it is desirable in many systems to produce a bidirectional movement of the equipment, direct current motors are often used to drive such equipment, in which the polarity of the electrical current provided to the motor can be simply reversed to correspondingly reverse the direction of movement of the piece of equipment.

Some of the existing dynamic braking circuits enter a braking mode by short-circuiting the motor's armature, thereby producing a back-emf which in turn creates a reverse current generating a magnetic field which opposes the motor's rotation. One such circuit is disclosed in Whited (U.S. Pat. No. 3,786,329), which uses "smoothing inductors" in series with the reverse current to "smooth" the reverse current. The smoothing inductors have the effect of limiting the reverse current, so that the switching SCR's (silicon controlled rectifiers) are not required to conduct the very large reverse current produced by directly shorting the motor armature, which could destroy the SCR's if such current were not limited. A braking circuit which uses a braking resistor is disclosed in Meissen et al. (U.S. Pat. No. 3,876,920) in which the reverse current is limited by such braking resistors. Meissen et al. also discloses a mode of braking known as "regenerative" braking, whereby the motor is short-circuited by SCR's while the armature current (which becomes a reverse current) is fed back into the power system under certain circumstances, thereby charging a battery or a DC power source. Another braking circuit which uses a braking resistor and also has a regenerative braking mode is disclosed in Pham (U.S. Pat. No. 4,386,299).

A major disadvantage of using braking resistors and/or braking inductors is that, since the reverse current becomes limited, the magnetic field produced by such reverse current also is limited. By limiting the magnetic field that opposes the rotational inertia of the motor, the braking circuit fails to stop the motion of the piece of equipment as quickly as possible. Even existing equipment which provides a "hard" stopping mode does not absorb the maximum reverse current without some type of external components (i.e., other than the SCR's) for switching that armature's current.

In many conveyor applications, it is desirable to have a "soft" start along with a "hard" stop. In other words, the conveyor will start to move using a limited acceleration mode (a "soft" start), then build up to full speed. When it is desired to stop the conveyor's movement, a "hard" stop would be as sudden as the dynamic braking circuit will allow. Such soft start/hard stop controllers are useful for unidirectional applications, however, the existing soft start/hard stop controllers are limited for bidirectional applications in that they have a "mirrored" acceleration/deceleration capability. For example, if the conveyor is started in a "soft" mode while moving to the right, and then stopped in a "hard" mode while still moving to the right, that same conveyor, as it initiates movement in the opposite "left" direction, must necessarily undergo a "hard" start as it starts to accelerate to the left. Such conveyor will then have a "soft" stop as it slows down while still moving to the left. In many conveyor applications, the most desirable mode of starting and stopping is to have a soft start and hard stop regardless of the direction of the equipment or conveyor. Existing dynamic braking circuits cannot provide these desirable operational features.

Many of the dynamic braking electrical controllers available at the present time also require various capacitors and inductors to provide some noise immunity to limit destructive "false" triggers of the load current-bearing SCR's. Such false triggering still can occur in existing dynamic braking controllers, and often leads to irreversible destruction of such load current-bearing SCR's even when the transient noise impulses are relatively short in time duration.

SUMMARY OF THE INVENTION

Accordingly, it is a primary object of the present invention to provide a dynamic braking circuit which is largely immune to transient noise impulses, even for those which are relatively long in duration, and which will not allow destruction of the load current-bearing silicon controlled rectifiers (SCR's) of the dynamic braking circuit.

It is another object of the present invention to provide a dynamic braking circuit which can absorb the full reverse current produced by back-emf when the armature of the motor is short-circuited by load current-bearing SCR's, without the need for various external series resistors or inductors to either limit or smooth the reverse current.

It is a further object of the present invention to provide a dynamic braking circuit which has the capability of a "soft" start and "hard" stop in both directions of a bidirectional conveyor system.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved dynamic braking circuit is provided having the capability of electrically braking the rotation of a motor by short-circuiting the armature of that motor, thereby creating a reverse current and reverse magnetic field to oppose the motor's rotation. The dynamic braking circuit uses high-voltage, high-current semiconductor components, such as SCR's, to switch the full-load current to the motor while it is running under normal conditions. The same components also switch into a short-circuiting mode for braking the motor as quickly as possible without the use of external braking resistors, or other electrical components which may limit the magnitude of the reverse current. The dynamic braking circuit includes the necessary logic and gating signals to place the load current-bearing semiconductors in a conducting mode or a non-conducting mode, as needed to conduct each half-cycle of the incoming alternating current sine wave, while enhancing noise immunity of the overall circuit. By this scheme of only having the necessary semiconductors gated in their conducting states during a particular half-cycle, noise pulses cannot generate false triggers in other of the load current-bearing semiconductors, which if falsely turned on, could result in their permanent destruction. The dynamic braking circuit has both slow and fast running speeds for each of the two directions of movement (forward and reverse), and therefore, can provide a soft start/hard stop in each of the directions of movement for the equipment being controlled.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE INVENTION

Reference will now be made in detail to the present preferred embodiment of the invention, an example of which is illustrated in the accompanying drawings, wherein like numerals indicate the same elements throughout the views.

Figure 1:
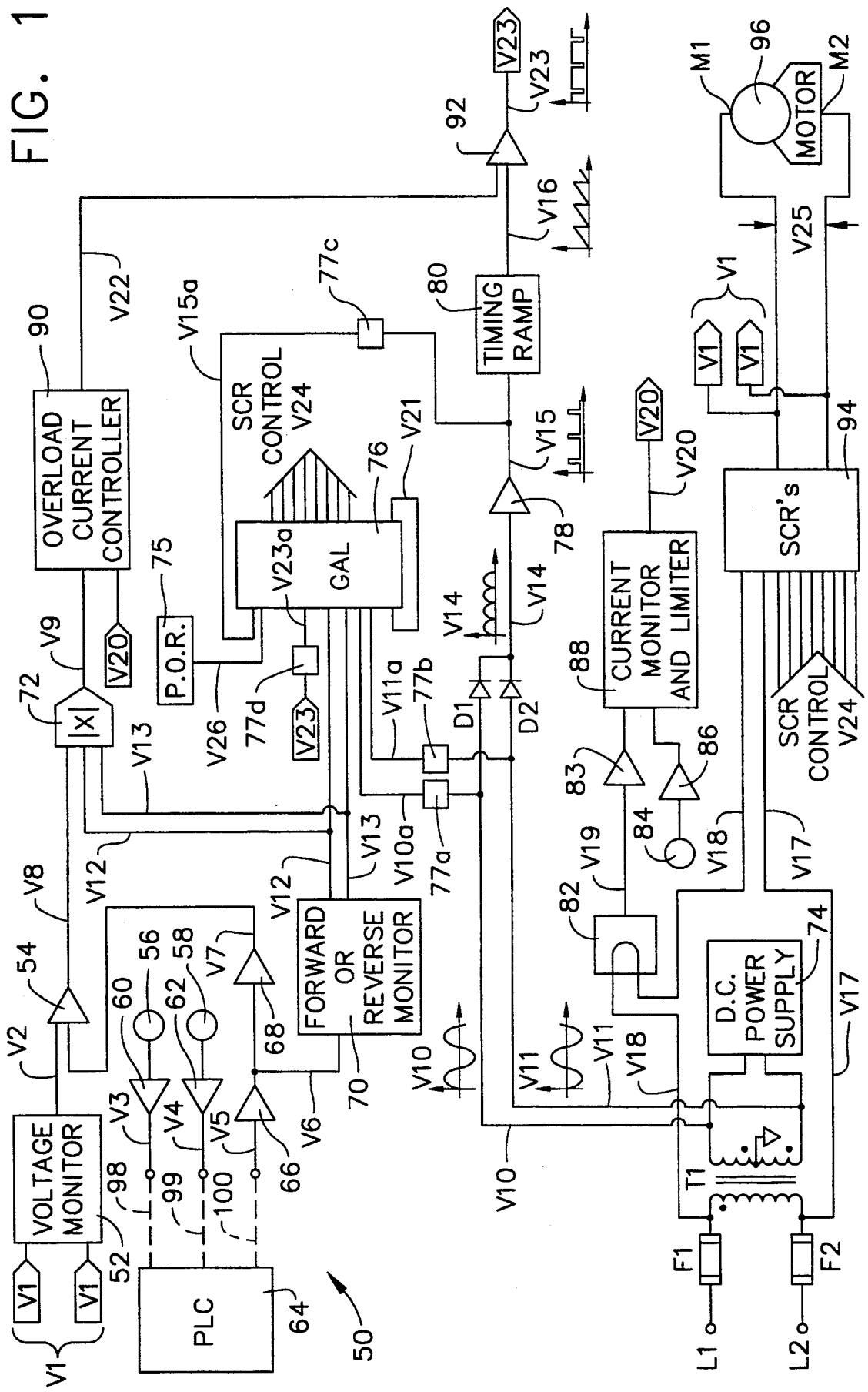
FIG. 1 is a block diagram of a dynamic braking circuit constructed in accordance with the principles of the present invention.

Referring now to the drawings, FIG. 1 shows the entire dynamic braking circuit, generally designated by the numeral 50, of the present invention. FIG. 1 is, for the most part, a block diagram so as to show all of the functions and control signals which occur in dynamic braking circuit 50. The incoming line power is preferably 220 volts AC, and is connected to terminals L1 and L2. The power is then fed through two fuses designated F1 and F2, and further to a transformer designated T1. The remainder of the power circuit will be described in more detail below.

The output stage of dynamic braking circuit 50 is connected to a direct current motor 96, and has a signal voltage v1 which is proportional to the motor's output voltage. This representative output voltage v1 is directed into a voltage monitor circuit designated by the numeral 52. The output of voltage monitor circuit 52 is a voltage designated v2, and is proportional to the speed of DC motor 96. Voltage v2 is directed into a different amplifier and integrator circuit 54, which also has a second input, described below.

A separate programmable logic controller (PLC) 64 is used to control the overall operation of the apparatus which is being driven by DC motor 96. The illustrated embodiment of FIG. 1 has been successfully employed to drive a conveyor (not shown) which has bi-directional operation. PLC 64 determines when the conveyor is to move forward, when the conveyor is to break to a halt in the forward direction, when the conveyor is to move in the reverse direction, and, again, when the conveyor is to brake to a halt in the reverse direction. Dynamic braking circuit 50 has available certain limit controls, such as the maximum forward speed and the maximum reverse speed, to better control the conveyor.

A maximum forward speed adjustment voltage v3 is implemented with a voltage regulating circuit 60 that is controlled by a potentiometer 56. This maximum forward speed voltage v3 is fed into an input of PLC 64 via forward speed signal line 98. A similar maximum reverse speed voltage v4 is implemented using voltage regulator 62 and having a potentiometer adjustment 58. Maximum reverse speed voltage v4 is directed into an input of PLC 64 via reverse speed signal line 99.

PLC 64 decides whether the conveyor is to be moved in the forward or reverse direction, and also decides whether the forward direction is to be a fast speed or a slow speed, and whether the reverse direction is to be a fast speed or a slow speed. If the logic of PLC 64 decides that the fast forward speed should be selected, then maximum forward speed adjust signal voltage v3 will be fed through a relay contact (an output of PLC 64) via control input signal line 100, as voltage v5. On the other hand, if the logic of PLC 64 decides that the conveyor should be running in the slow forward mode, then maximum forward speed adjust signal voltage v3 will be directed through a resistance before being further directed through a second relay contact, which in turn would output a lower voltage from PLC 64 via control input line 100, again as voltage v5.

PLC 64 can also control the conveyor in the reverse direction by selecting either a fast reverse movement or a slow reverse movement. In the case of a fast reverse movement, the maximum reverse speed voltage v4 would be fed through a relay contact in PLC 64 (an output of PLC 64) then directed onto control input signal line 100, as voltage v5. For the slow reverse movement, PLC 64 would take the maximum reverse speed voltage v4 and direct it through a resistor before further directing it through another relay contact inside PLC 64, thereby outputting a signal of reduced magnitude as control input voltage v5, via control input signal line 100.

The preferred maximum: voltage levels of this portion of the dynamic braking circuit 50 are plus and minus 15 volts DC, which are the voltage levels that are used to supply most of the integrated circuit chips of dynamic braking circuit 50. If, for example, the maximum forward speed adjustment v3 was set at +10 volts DC, then its corresponding control input voltage v5 would also be +10 volts if fast forward mode were selected by PLC 64. If slow forward mode were selected by PLC 64, then maximum forward speed voltage v3 would be reduced in magnitude by a resistor at PLC 64, and the reduced voltage would be output at the control input voltage v5 at about +5 volts (which preferably would be about ½ of the maximum forward speed voltage).

On the other hand, if the reverse direction is selected by PLC 64, then the maximum reverse speed adjustment voltage v4 would be used to determine the value of the control input voltage v5. If, for example, PLC 64 selected the fast reverse mode, then the voltage at v4, which could be set at −10 volts DC, would then be directly output as the control input voltage v5. If the slow reverse mode were selected by PLC 64, then the maximum reverse speed voltage v4 would be diminished in magnitude by resistor at PLC 64 before it is output as control input voltage v5, at about −5 volts DC (which preferably would be about ½ of the maximum reverse speed voltage). By using the remote PLC 64 in this manner, dynamic braking circuit 50 can control both maximum reverse and forward speeds, and both the somewhat slower forward and reverse speeds, of the controlled piece of equipment (which is a conveyor in the illustrated embodiment).

Control input voltage v5 is directed into a signal conditioner 66, which produces a direction/speed signal v6. Direction/speed signal v6 is later used by dynamic braking circuit 50 to determine not only the speed to drive DC motor 96, but also contains the information as to which direction DC motor 96 should be turning. If the magnitude of v6 is a positive voltage, then a forward speed has been selected, and, vice verse, if the magnitude of v6 is negative, then a reverse direction has been selected. Direction/speed signal v6 is directed into a setpoint signal generator 68, which produces a setpoint signal v7. Setpoint signal v7 is then directed into integrator and difference amplifier 54 as its second input (along with the motor speed signal v2). Integrator and difference amplified 54 produces an output voltage v8, which is an error signal voltage. This error signal voltage v8 will be equal to zero of the actual speed of DC motor 96 is equal to the desired speed as determined by the combination of dynamic braking circuit 50 and PLC 64. If the actual speed of DC motor 96 is not the same as the desired speed selected by PLC 64 and dynamic braking circuit 50, then voltage v8 will not have a zero magnitude, but will instead be either a positive DC voltage if DC motor 96 is turning too slowly, or a negative DC voltage if DC motor 96 is turning too rapidly. Error signal voltage v8 is directed into an absolute value amplifier 72, which also has two other inputs, discussed below.

The direction/speed command signal v6 is directed to a monitor circuit 70 which determines whether the conveyor should be traveling in either the forward or reverse direction. Forward or reverse monitor 70 has a threshold detector, and if the direction/speed signal v6 has a magnitude greater than 1.2 volts DC, then forward or reverse monitor 70 outputs a +15 volt DC signal as a forward control signal v12. On the other hand, if the direction/speed signal v6 has a magnitude less than −1.2 volts DC, then forward or reverse monitor 70 will output a +15 volt signal v13. Signals v12 and v13 are exclusive from one another; i.e., if v12 is at +15 volts DC, then v13 is at zero volts DC, and if signal v13 is at +15 volts DC then v12 is at zero volts DC.

If the magnitude of direction/speed command v6 is less than +1.2 volts DC and is greater than −1.2 volts DC (i.e., it is near zero volts DC), then both forward control signal v12 and reverse control signal v13 would be set to zero volts DC. In this condition, PLC 64 is not attempting to command the conveyor to move either forward or reverse, and is essentially commanding the conveyor to be in a stopped condition.

Forward control signal v12 and reverse control signal v13 are directed into a generic array of logic (GAL) 76, which will be discussed in detail below. Signals v12 and v13 are also directed as inputs into the absolute value amplifier 72. Absolute value amplifier 72 converts the error signal v8 into a positive DC signal in the range of 0 to +15 volts DC, designated v9. Absolute value signal v9 is directed as one of the inputs to overload current controller 90, and its operation will be described in detail below.

Incoming line voltage, after passing through fuses F1 and F2 as discussed above, is directed to transformer T1, which is preferably a center-tapped isolation transformer. One transformer which has been successfully used for this application is manufactured by Signal Transformer Company under the part number DST 5-28. On the secondary side of transformer T1, the alternating current is sent through a bridge rectifier and power supply circuit 74, thereby creating the necessary DC power supply voltages to operate dynamic braking circuit 50. Some of the DC voltages required in the illustrated embodiment are +15 VDC, −15 VDC, and +5 VDC, which are merely exemplary of the possible voltages that could be used in the present invention. A voltage v10 is derived from one side of the secondary of transformer T1, and is designated as phase-1 ($\phi1$) in dynamic braking circuit 50. A second voltage v11 is derived from the opposite side of the secondary of transformer T1, and is designated as phase-2 ($\phi2$) because it is 180° out of phase with v10. Voltage v10 is directed into a voltage-limiting circuit 77a, which uses a zener diode to lower the voltage magnitude to a level acceptable by other integrated circuits. The resulting signal is designated v10a, and is one of the inputs to GAL 76. Similarly, voltage v11 is directed into a voltage-limiting circuit 77b, which lowers the voltage and creates a new signal v11a, which also can be directed into one of the inputs of GAL 76.

Voltages v10 and v11 are used as synchronizing (SYNC) signals for the first and second phases of the incoming line power to dynamic braking circuit 50. The first phase SYNC signal v10 is fed through a diode D1, and the second phase SYNC signal v11 is fed through a different diode D2. The cathodes of diodes D1 and D2 are tied to a common node, and a new rectified (combined) SYNC signal v14 is created at that node. As can be seen on FIG. 1, $\phi1$ SYNC signal v10 is an alternating current signal having a 180 ° phase differential from $\phi2$ SYNC signal v11. The combined SYNC signal v14 is a direct current signal which has peaks and valleys occurring 120 times per second. V14 is directed into a SYNC signal square wave generator 78, which outputs a voltage v15 as a pulse signal that has a positive amplitude at the peak of each of the rectified sign waves of combined SYNC signal v14. Pulse signal v15 is directed into a voltage dividing circuit 77c, thereby creating a new signal voltage v15a which is of the proper magnitude to be directed into GAL 76.

Pulse signal v15 is also directed into a timing ramp generator 80, which generates a sawtooth signal v16, which is depicted on FIG. 1. Sawtooth signal v16 is reset to near zero volts every time timing ramp generator 80 receives a positive pulse at its input from signal v15. Once this positive pulse is received, timing ramp generator 80 starts to produce a positively-sloped ramp signal which continues until the next positive pulse is received at its input, and the magnitude of its output v16 is dropped to near zero volts again. This process is continuously repeated, thereby generating a sawtooth-shaped waveform having a period of 1/120 of a second. Sawtooth signal v16 is directed into a threshold detector 92, having a function which will be described in detail below.

After the incoming line voltage passes through fuses F1 and F2, the line power is fed directly into the bank of SCR's 94, via power signals designated v17 and v18. Power signal v18 is additionally run through a current transformer 82 which includes a Hall detector element, thereby creating a low voltage alternating current signal v19 that is proportional to the line current being fed into SCR's bank 94. Low voltage AC signal v19 is proportional to the current being drawn by DC motor 96, and can thereby be used to detect a current overload through DC motor 96. Motor current signal v19 is directed into a DC averager circuit 83, which has a direct current output that is proportional to the RMS value of motor current signal v19, and is fed into a current monitor and limiter circuit 88.

The maximum motor current allowed by dynamic braking circuit 50 can be adjusted using potentiometer 84. The setting of potentiometer 84 determines the signal output of the maximum current signal generator 86, which is also connected to the current monitor and limiter circuit 88 as an input. Current monitor and limiter circuit 88 outputs a signal designated v20, which is held to near zero volts under normal operating conditions, however, when a current overload is detected, v20 falls to the value of $-15$ volts DC.

Current overload signal v20 is fed as an input to the current overload controller 90, which also has an input v9 representing the absolute value of the speed control signal. Current overload controller 90 outputs a signal v22 which, under normal operating conditions, is a positive DC voltage that is proportional to the speed control signal v9. Under current overload conditions, however, v22 is clamped to a near-zero voltage level.

Signal v22 is, in effect, a target threshold voltage and is directed to the input of threshold detector 92. The other input of threshold detector 92 is the sawtooth signal v16, and when the magnitude of sawtooth signal v16 exceeds the target threshold voltage v22, threshold detector 92 outputs a logic 1 signal as a variable pulse-width signal v23, which has a pulse width proportional to the desired speed of DC motor 96. Pulse width signal v23 operates in the opposite sense, in that the longer v23 is in its logic 1 state, o the lower the desired speed of DC motor 96. To achieve full speed of DC motor 96, v23 would remain as a low voltage signal (at logic 0) for a maximum amount of time of each pulse-width period. To achieve zero speed, v23 would rise to its logic 1 state for a maximum amount of time of each pulse-width period. If overload current controller 90 detects an overload condition, target threshold voltage signal v22 will drop to near zero volts, and v23 will rise to a logic 1 value for most of each pulse-width period. This would effectively drive DC motor 96 to its minimum speed.

Pulse-width speed signal v23 is directed through a voltage divider circuit 77d, thereby producing a signal v23a which has a magnitude compatible for use as an input to GAL 76. GAL 76 has a plurality of outputs, eight of which preferably control the various SCR's in SCR bank 94 by use of SCR control signals v24 (shown as a group of signals on FIG. 1). Generally speaking, each SCR of SCR bank 94 will conduct a larger portion of the incoming power as the motor speed is to be increased, as determined by pulse-width speed signal v23. All of the SCR's in SCR bank 94 have outputs which are connected to a pair of wires that carry a direct current power output signal v25 to provide power to DC motor 96. The magnitude of v25 determines the speed of DC motor 96, and the polarity of v25 determines the direction of rotation of DC motor 96. The precise control of the switching of each SCR of SCR bank 94 will be described in detail hereinafter.

When it is desired to brake the conveyor to a stop, PLC 64 will generate a zero-voltage signal on control input signal line 100, which results in the control input voltage v5 being 0 VDC. When this occurs, the forward or reverse monitor circuit 70 causes its outputs v12 and v13 to each become zero volts as well, and this information is provided to the inputs of GAL 76. When this occurs, certain SCR's of SCR bank 94 are placed into their conductive state, thereby short-circuiting DC motor 96 and disconnecting DC motor 96 from the incoming AC power line. By short-circuiting DC motor 96, SCR bank 94 allows a reverse current to flow through DC motor 96, which produces a reverse magnetic field that tends to halt the rotation of the motor 96. The SCR's in SCR bank 94 must temporarily absorb a large amount of current during this braking operation. The magnitude of this current is :large enough that it could tend to be sensed as an overload condition by overload current controller 90. Current monitor 82, however, senses only AC current, and so it detects no current at all during the braking operation because the incoming AC power line is disconnected from the motor 96 by SCR bank 94. Therefore, the overload current controller 90 will not generate a current overload signal during the braking operation, regardless of how large the magnitude of reverse current becomes during the braking operation.

Figure 2:
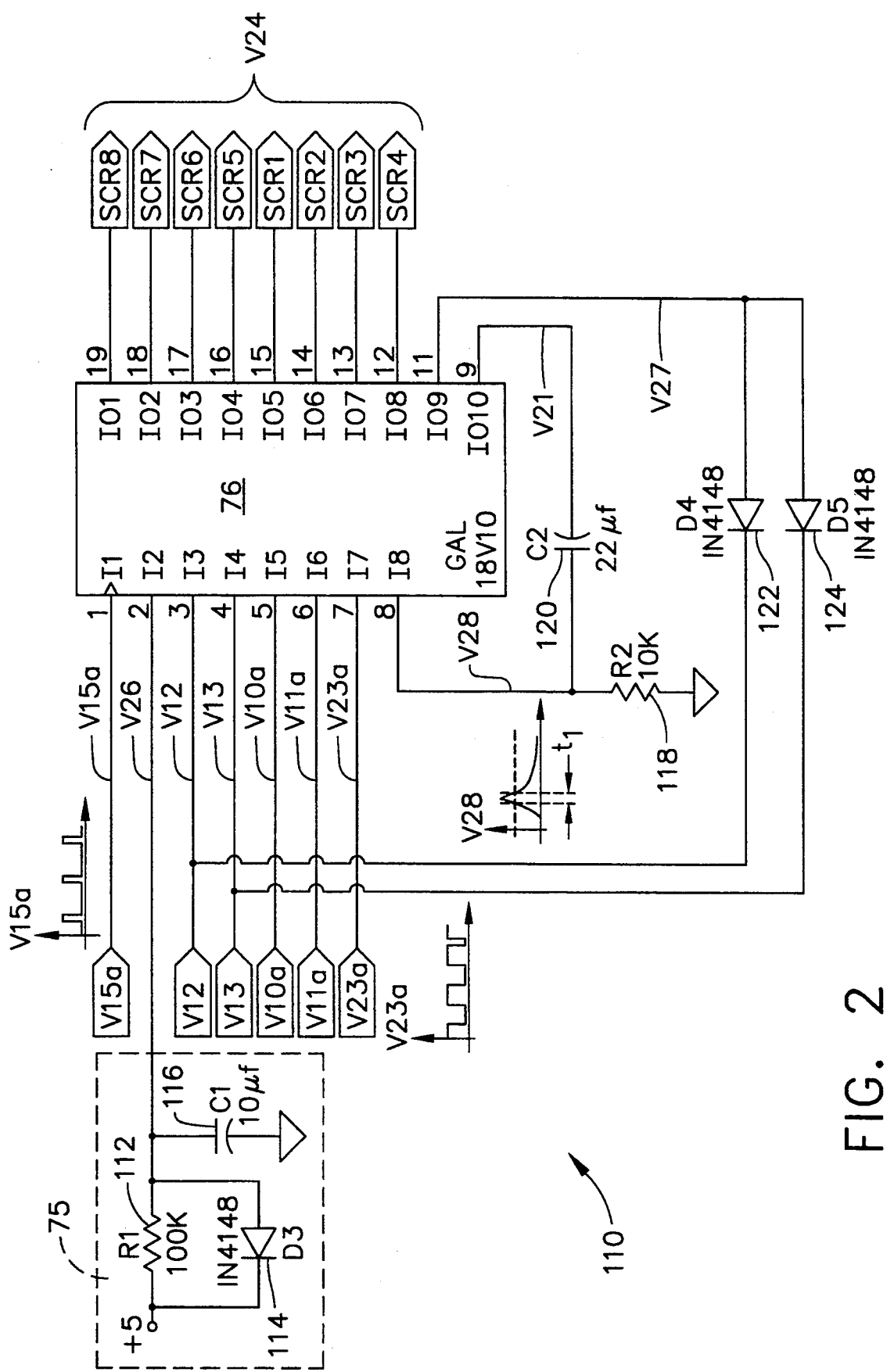
FIG. 2 is a partial schematic diagram of the dynamic braking circuit of FIG. 1, depicting the circuitry closely associated with the GAL (generic array of logic) integrated circuit.

A Power-on-Reset circuit 75 is used to generate a reset signal v26 as an input to GAL 76. The details of Power-on-Reset circuit 75 are depicted in FIG. 2, which shows the details of the GAL external circuit 110 in a schematic diagram format. Power-on-Reset circuit 75 includes a resister 112 (R1) and a diode 114 (D3) which are connected in parallel to a $+5$ volt DC power supply. On the load side of this parallel combination is a capacitor 116 (C1) which is used to control the duration of Power-on-Reset signal v26, which is connected to pin 2 of GAL 76. The preferred values of these components are depicted on FIG. 2.

GAL 76 is an integrated circuit, preferably a part number 18V10, manufactured by Lattice Semiconductor Corporation of Hillsboro, Oreg. It will be understood that many other types of logic array devices could be used rather than a GAL, including such devices as a PAL (programmable logic array) and a ROM (read only memory). GAL 76 is a twenty-pin DIP (dual in-line) package, which has eight inputs (pins 1–8), and ten outputs (pins 9, 11–19). GAL 76 comprises a large plurality of potential cross connections between vertical and horizontal lines of a standard GAL 18V10 logic diagram. To determine whether a particular vertical line is connected to a particular horizontal line, a "JEDEC fuse map" must be programmed into the chip, so that the proper connections or non-connections between all horizontal and vertical lines are established. A binary map is used to program the JEDEC fuse map, and a preferred binary JEDEC fuse map is provided below, which has been successfully employed in the illustrated embodiment. In this binary map, a "1" means a closed connection at a horizontal/vertical node, and a "0" means an open connection at such a node.

```
       S  P  R  F  S  S  S  B  B B
       Y  O  E  W  N  N  R  R R
       N  R  V  D  C  C  P  K  K K
Feed   C        2  1           I O
back     19 18 17 16 15 14 13 12  9
Input  1  2  3  4  5  6  7  8  11
L00000 000000000000000000000000000000000000*

L00036 111111111111111111111111111111111111*
L00072 111101110111101001111011101111110111*
L00108 000000000000000000000000000000000000*
L00144 000000000000000000000000000000000000*           Pin 19
L00180 000000000000000000000000000000000000*
L00216 000000000000000000000000000000000000*           SCR-8
L00252 000000000000000000000000000000000000*
L00288 000000000000000000000000000000000000*
L00324 000000000000000000000000000000000000*

L00360 111111111111111111111111111111111111*
L00396 111101110100111011011110111111110111*
L00432 000000000000000000000000000000000000*
L00468 000000000000000000000000000000000000*           Pin 18
L00504 000000000000000000000000000000000000*
L00540 000000000000000000000000000000000000*           SCR-7
L00576 000000000000000000000000000000000000*
L00612 000000000000000000000000000000000000*
L00648 000000000000000000000000000000000000*

L00684 111111111111111111111111111111111111*
L00720 111101101111011101101111011111111111*
L00756 111011111111111111111111111111111011*
L00792 000000000000000000000000000000000000*           Pin 17
L00828 000000000000000000000000000000000000*
L00864 000000000000000000000000000000000000*           SCR-6
L00900 000000000000000000000000000000000000*
L00936 000000000000000000000000000000000000*
L00972 000000000000000000000000000000000000*

L01008 111111111111111111111111111111111111*
L01044 111101110110110110110110111111111111*
L01080 111011111111111111111111111111111011*
L01116 000000000000000000000000000000000000*           Pin 16
L01152 000000000000000000000000000000000000*
L01188 000000000000000000000000000000000000*           SCR-5
L01224 000000000000000000000000000000000000*
L01260 000000000000000000000000000000000000*
L01296 000000000000000000000000000000000000*

L01332 111111111111111111111111111111111111*
L01368 111101011111111111111111111111111111*
L01404 111101111111111111111111111111111011*
L01440 000000000000000000000000000000000000*           Pin 15
L01476 000000000000000000000000000000000000*
L01512 000000000000000000000000000000000000*           SCR-1
L01548 000000000000000000000000000000000000*
L01584 000000000 000000000000000000000000000*
L01620 000000000000000000000000000000000000*
L01656 000000000000000000000000000000000000*
L01692 000000000000000000000000000000000000*

L01728 111111111111111111111111111111111111*
L01764 110101111111111111111111111111111111*
L01800 111011111111111111111111111111111011*
L01836 000000000000000000000000000000000000*           Pin 14
L01872 000000000000000000000000000000000000*
L01908 000000000000000000000000000000000000*           SCR-2
L01944 000000000000000000000000000000000000*
L01980 000000000000000000000000000000000000*
L02016 000000000000000000000000000000000000*
L02052 000000000000000000000000000000000000*
L02088 000000000000000000000000000000000000*
```

-continued

```
L02124 111111111111111111111111111111111111*
L02160 111101111111101111111101111111110111*
L02196 000000000000000000000000000000000000*
L02232 000000000000000000000000000000000000*           Pin 13
L02268 000000000000000000000000000000000000*
L02304 000000000000000000000000000000000000*           SCR-3
L02340 000000000000000000000000000000000000*
L02376 000000000000000000000000000000000000*
L02412 000000000000000000000000000000000000*

L02448 111111111111111111111111111111111111*
L02484 111011101011111110111111111110111*
L02520 000000000000000000000000000000000000*
L02556 000000000000000000000000000000000000*           Pin 12
L02592 000000000000000000000000000000000000*
L02628 000000000000000000000000000000000000*           SCR-4
L02664 000000000000000000000000000000000000*
L02700 000000000000000000000000000000000000*
L02736 000000000000000000000000000000000000*

L02772 111111111111111111111111111111111111*
L02808 111101111111111111 111111111101111111*
L02844 000000000000000000000000000000000000*
L02880 000000000000000000000000000000000000*           Pin 11
L02916 000000000000000000000000000000000000*
L02952 000000000000000000000000000000000000*           Brake
L02988 000000000000000000000000000000000000*           sensor
L03024 000000000000000000000000000000000000*           int.
L03060 000000000000000000000000000000000000*

L03096 111111111111111111111111111111111111*
L03132 111101110111011111111111111111111111*
L03168 000000000000000000000000000000000000*
L03204 000000000000000000000000000000000000*           Pin 9
L03240 000000000000000000000000000000000000*
L03276 000000000000000000000000000000000000*
L03312 000000000000000000000000000000000000*           Brake
L03348 000000000000000000000000000000000000*           sensor
L03384 000000000000000000000000000000000000*           out.

L03420 000000000000000000000000000000000000*

L03456 111111111111111110101111111111111111*
L03492 111111111111111111111111111111111111*
L03528 111111111111*
CB855*
```

The logic inside GAL 76 could be alternatively implemented with discrete components, however, the timing of the various pulse signals is critical in this dynamic braking application, and the variation of propagation delays among discrete components can become a problem, particularly with respect to a lack of noise immunity of the overall circuit. By using a GAL integrated circuit, the relatively precise physical architecture of its internal components can be used to advantage, thereby providing a precisely known propagation delay between each of its elements, which tends to help eliminate such noise problems (in the form of misfires of individual SCR's of SCR bank 94).

Some of the inputs used by GAL 76 include the 120 Hz peak-detector pulse signal v15a, forward control signal v12, reverse control signal v13, $\phi 1$ SYNC signal v10a, $\phi 2$ SYNC signal v11a, and pulse-width speed signal v23a. Eight of the outputs of GAL 76 are used to provide gating signals to the bank of SCR's 94, and have a group designation v24.

One of the other output signals from GAL 76, designated v21, becomes active during the braking mode. At the start of a braking interval, v21 rises to its logic 1 state, then travels through an R-C circuit and becomes signal v28 which is fed back as an input into GAL 76. A capacitor 120 (C2) and a resistor 118 (R2) create a waveform which is depicted in FIG. 2. The time interval $t_1$, depicted on FIG. 2, is approximately 0.2 seconds, and is used as a minimum braking mode interval timer. If PLC 64 would call for a new forward or reverse motion by the conveyor, during a braking interval, signal v28 would prevent control input signal v5 from having any effect on the gating on any of SCR's and SCR bank 94 until the braking mode has been completed. The logic for this function all resides within GAL 76.

The other output from GAL 76, designated v27, is a direction inhibit signal which prevents a quick change of direction at improper moments during the operation of dynamic braking circuit 50. Direction inhibit signal v27 is connected to two diodes 122 (D4) and 124 (D5), which are connected to the same inputs as the forward control signal v12 and reverse control signal v13, respectively.

Figure 3:
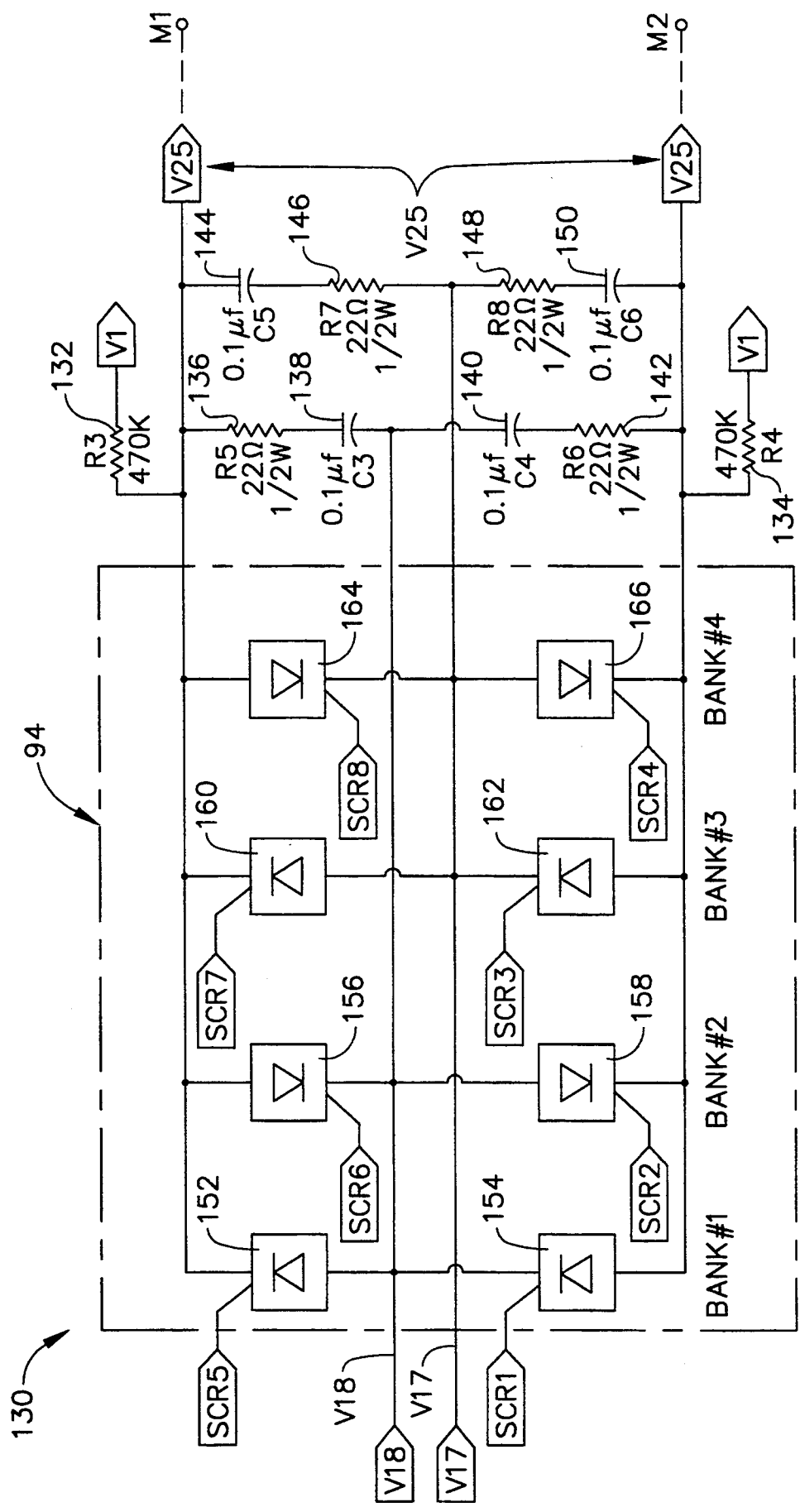
FIG. 3 is a combined schematic diagram and block diagram of the circuitry associated with the bank of SCR's of the dynamic braking circuit of FIG. 1.

FIG. 3 depicts a block diagram 130 of the SCR power circuits, including SCR bank 94. Alternating current from the AC power source is brought to one side of each of the banks of SCR's in the form of power signals v17 and v18. SCR banks #1 and #2 are connected to v18, and SCR banks #3 and #4 are connected to v17. When PLC 64 calls for a forward movement of the conveyor, SCR banks #2 and #4 start to conduct current, thereby imparting a positive voltage at motor terminal M1, and a relatively negative voltage at motor terminal M2. During the positive half-wave of v18, current is conducted through SCR blocks 158 and 164; during the positive half-wave of v17, current is conducted through SCR blocks 166 and 156. The exact timing of the conductive periods for these blocks of SCR's is directly controlled by GAL 76, which is described in detail above.

When GAL 76 turns on SCR blocks 158 and 164, (using SCR2 and SCR8 gating signals, respectively), the gating signals for the other two SCR blocks 156 and 166 (SCR6 and SCR4 gating signals, respectively) are turned off. This is done to enhance the noise immunity of dynamic braking circuit 50, so that if a transient noise pulse occurs for less than 1/120 second (the time interval for a half-wave of 60 Hz alternating current), it would not be able to cause the incorrect SCR's to misfire and incorrectly turn on. Such a misfire can, of course, be disastrous if more than one SCR which is connected to the same incoming power line is turned on. In such an occurrence, the SCR would very likely become permanently damaged due to an over current condition.

As used in an SCR bank of the prior art, all four SCR's for the forward mode are simultaneously turned on, although two SCR's would be conducting at any given time, depending upon which phase is undergoing a positive waveform. In such prior art circuits, a very short noise pulse (less than 1/120 second) could create a refire at the wrong time, as the incoming AC sine wave transitions from a positive to negative waveform. For this reason, the prior art circuits tend to have in-series resistors or "smoothing" inductors to limit the current passing through their SCR's. Such extra electrical components do not always save the SCR's when a misfire occurs, and such SCR's often fail due to noise transients.

In the reverse mode of operation of the conveyor, PLC 64 will command other SCR's to conduct through the gating signals controlled by GAL 76. During a positive waveform of v18, SCR blocks 152 and 162 conduct current; during a positive half-waveform of v17, SCR blocks 160 and 154 conduct current, thereby imparting a positive voltage at motor terminal M2 and a relatively negative voltage at motor terminal M1. These SCR blocks are controlled by gating signals from GAL 76, including gating signal SCR5 for SCR block 152, gating signal SCR1 for SCR block 154, gating signal SCR7 for SCR block 160, and gating signal SCR3 for SCR block 162. When operating in a reverse mode, only two SCR blocks are gated "on" during any given half-cycle of the 60 Hz sine wave. During the time that SCR blocks 152 and 162 are conducting, the gating signals to SCR blocks 160 and 154 are turned off, so that if a noise pulse would occur, SCR blocks 160 and 154 could not conduct any current.

During the braking mode of operation, banks #1 and #2 of SCR bank 94 are turned on to short-circuit the armature winding of DC motor 96. SCR blocks 152, 154, 156, and 158 are gated on in pairs by GAL 76, so that the reverse voltage of the armature of DC motor 96 has a conductive path through these SCR blocks, thereby allowing a reverse current to flow through the SCR's and through the armature winding of motor 96. This reverse current induces a reverse magnetic field that opposes the rotation of motor 96, thereby braking it to a sudden halt. If motor 96 had previously been running in the forward mode, in which the motor terminal M1 was at a positive voltage with respect to motor terminal M2, then SCR blocks 156 and 158 would be turned on by use of gating signals SCR6 and SCR2, respectively. By use of these two SCR blocks, the motor winding is directly shorted out, thereby providing a path for the reverse current to oppose the motor's rotation.

On the other hand, if the motor had been running in the reverse mode before the braking command occurred, in which motor terminal M2 was at a positive voltage with respect to motor terminal M1, then SCR blocks 152 and 154 would be turned on by gating signals SCR5 and SCR1, respectively. As before, the reverse voltage in the armature would tend to create a reverse current that would now have a path to conduct through (SCR blocks 152 and 154), thereby braking the motor to a sudden halt.

As can be seen in FIG. 3, the braking circuit of the present invention has no in-series current-limiting resistors or "smoothing" inductors. The SCR's are the only components which directly conduct the reverse current during the braking operation, and therefore, the motor's rotation is brought to a halt as quickly as is possible using this electrical mode of braking. In other words, the SCR's are directly connected to both the AC power source (via signals $v_{17}$ and $v_{18}$) and to the DC motor 96 (via signal $v_{25}$ and terminals M1 and M2). As used herein, the term "directly connected" means that there are no intervening electrical components between the two devices which have the relationship of being directly connected. As will be explained in detail hereinbelow, the overall effect of this circuit configuration is that SCR's directly switch the electrical current to DC motor 96 (both during movement and braking modes of operation) without the use of other in-series electrical components to limit the magnitude or rise-time of that electrical current.

The electrical components of FIG. 3 other than the SCR's are either voltage-dropping resistors 132 (R3) and 134 (R4), or are filtering R-C circuits composed of resistor and capacitor series combinations. Each of these combinations has a 22 ohm, ½ watt resistor in series with a 0.1 uf capacitor in the illustrated embodiment. Resistor 136 (R5) is in series with capacitor 138

(C3), and filters the voltage between v18 and v25 which is connected to motor lead M1. In a similar fashion, resistor-capacitor combinations 142 (R6)–140 (C4), 146 (R7)–144 (C5), and 148 (R8)–150 (C6), are connected between either v18 or v17 and the motor leads of which the output voltage v25 are connected to motor terminals M1 and M2.

Figure 4:
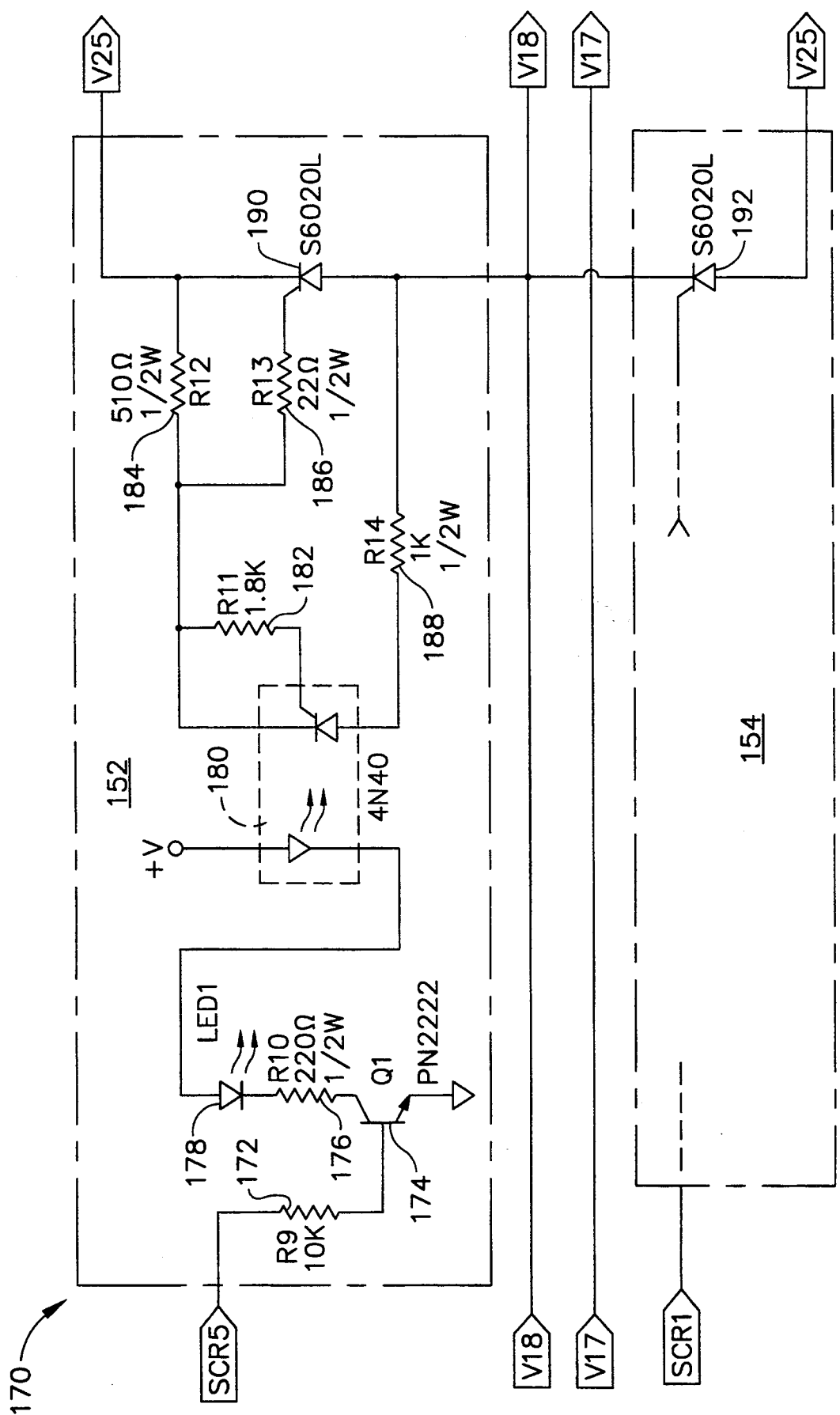
FIG. 4 is partial schematic diagram of the dynamic braking circuit of FIG. 1, depicting the details of one of the SCR circuits depicted in FIG. 3.

Each of the individual SCR banks comprises a number of electrical components, as depicted in FIG. 4. The individual SCR schematic diagram 170 depicts SCR block 152, which has a gating signal SCR5. When SCR5 rises to its logic 1 state, it turns on transistor 174 (Q1) through a base resistor 172 (Rg). When that occurs, current will flow through the LED portion of opto-coupler 180, and continue through a second LED 178, and through collector resistor 176 (R10). When this occurs, the photo-SCR portion of opto-coupler 180 will begin to conduct electricity, thereby gating the high-current SCR 190 through its gating input which is connected to resistor 186 (R13). Resistors 184 (R12) and 188 (R14) are biasing resistors, and resistor 182 (R11) is selected to de-sensitize the gain of opto-coupler 180. In this manner, SCR bank 152 has relatively high noise immunity.

As described above, SCR 190 would only be gated to conduct electricity at a time when v18 would be undergoing a positive half-waveform, so that current would be conducted into the output voltage v25. In a similar manner, SCR 192, which is the high-current carrying SCR of SCR block 154 (operating according to gating signal SCR1), would conduct electricity only during a negative half-waveform of input voltage v18. Again, as described above, this mode of operation is intended to protect the high current-carrying SCR's from false triggering during noise pulses which may enter the system. If a particular SCR is not being gated, it will not conduct electricity even during a noise impulse.

It will be understood that, by using SCR's as the load current-carrying devices of dynamic braking circuit 50, the braking cycle cannot commence until the end of one of the conduction cycles of a particular half-waveform of the power sine wave. Once a zero-crossing is achieved, the braking cycle will begin with the appropriate gating commands from GAL 76.

It will also be understood that if high voltage, high current-carrying transistors were used in lieu of the SCR's of the illustrated embodiment, the braking cycle could occur at any time during a conduction cycle of the incoming power sine wave. Of course, a drawback of such "instantaneous" switching would be that noise spikes would occur when disconnecting the forward current through a particular pair of transistors to interrupt the forward or reverse rotation of the motor 96. A greater amount of noise immunity would have to be built into the circuit to overcome such noise spikes. Transistors are available today which could be used in such a circuit, and in particular, a MOSFET (metal oxide semiconductor, field effect transistor) could be used in this application.

Dynamic braking circuit 50 is usable with bi-directional movements for conveyors and other equipment involving the use of reversible motors. In combination with PLC 64, dynamic braking circuit 50 has the capability of initiating movement in either direction in a "slow" mode, thereby providing a "soft" start. In addition, dynamic braking circuit 50 can bring the conveyor or other moving equipment to a "hard" stop while moving in either direction. PLC 64 has access to all modes of operation, simply by opening or closing the corresponding contacts so that the correct voltage is output from PLC 64 onto control input signal line 100.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A control and dynamic braking circuit for movable equipment comprising:
    (a) a plurality of semiconductor switching devices for switching electrical current arriving from an alternating current electrical power source, said alternating current approximating a sine wave, said semiconductor switching devices each containing a gating input, a load-current input, and a load-current output, said semiconductor switching devices directly switching said electrical current to the equipment, wherein the load-current inputs of said semiconductor switching devices are directly connected to said alternating current electrical power source, and the load-current outputs of said semiconductor switching devices are directly connected to said equipment;
    (b) a first controller for determining one of a plurality of operating modes of the equipment, said operating modes comprising running, braking, and stop modes; and
    (c) a second controller for individually selecting the gating input of each of the plurality of semiconductor switching devices at time intervals consistent with placing said semiconductor switching devices in one of a conducting and non-conducting mode, so as to operate said equipment in one of said operating modes, said second controller, during a running mode, selecting the gating inputs of only a first group of the plurality of semiconductor switching devices to conduct electrical current to the equipment during each positive half-cycle of the sine wave of the alternating current, and selecting the gating inputs of only a second group of the plurality of semiconductor switching devices to conduct electrical current to the movable equipment during each negative half-cycle of the sine wave of the alternating current.

2. The control and dynamic braking circuit as recited in claim 1, wherein the movable equipment includes a direct current motor driving device having an armature, and wherein said second controller comprises means for selecting the gating inputs of a third group of the plurality of semiconductor switching devices to effectively short-circuit the armature of said direct current motor, thereby producing a reverse current having a magnitude and a rise-time which dynamically brakes the direct current motor to a halt, without the use of other in-series electrical components to limit the magnitude of said reverse current, and without the use of other in-series electrical components to limit the rise-time of said reverse current.

3. A control and dynamic braking circuit for movable equipment comprising:
  (a) a plurality of semiconductor switching devices for switching electrical current arriving from an alternating current electrical power source, said semiconductor switching devices each containing a gating input, a load-current input, and a load-current output, said semiconductor switching devices directly switching said electrical current to the equipment, wherein the load-current inputs of said semiconductor switching devices are directly connected to said alternating current electrical power source, and the load-current outputs of said semiconductor switching devices are directly connected to said equipment;
  (b) a first controller for determining one of a plurality of operating modes of the equipment, said operating modes comprising running, braking, and stop modes; and
  (c) a second controller for individually selecting the gating input of each of the plurality of semiconductor switching devices at time intervals consistent with placing said semiconductor switching devices in one of a conducting and non-conducting mode, so as to operate said equipment in one of said operating modes, wherein the running operating mode of the movable equipment includes fast forward, slow forward, fast reverse, and slow reverse operating modes.

4. The control and dynamic braking circuit as recited in claim 1, wherein said movable equipment has both a forward direction and a reverse direction, and the operating modes of the movable equipment include means for a soft start and hard stop in the forward direction, and a soft start and hard stop in the reverse direction.

5. The control and dynamic braking circuit as recited in claim 1, wherein the semiconductor switching devices comprise silicon controlled rectifiers.

6. The control and dynamic braking circuit as recited in claim 1, wherein the semiconductor switching devices comprise transistors.

7. A method for controlling the movement of electrically operated equipment, said equipment having a plurality of Operating modes, said method comprising the steps of:
  (a) switching electrical current arriving from an alternating current electrical power source by use of a plurality of semiconductor switching devices, wherein said plurality of semiconductor switching devices are directly connected to said alternating current electrical power source, said semiconductor switching devices each having a gating input, said alternating current approximating a sine wave;
  (b) selectively transmitting said electrical current to the equipment, wherein said plurality of semiconductor switching devices are directly connected to said equipment;
  (c) determining the operating mode of the movable equipment, wherein the operating mode is one of running, braking, and stop; and
  (d) individually selecting the gating input of each of the plurality of semiconductor switching devices at time intervals consistent with placing said semiconductor switching devices in one of a conducting and non-conducting mode, so as to operate said equipment in one of said operating modes including running, braking, and stop mode, wherein during a running mode only the gating inputs of a first group of the plurality of semiconductor switching devices is selected to conduct electrical current to the movable equipment during each positive half-cycle of the sine wave of the alternating current of said electrical power source, and only the gating inputs of a second group of the plurality of semiconductor switching devices is selected to conduct electrical current to the movable equipment during each negative half-cycle of the sine wave of the alternating current of said electrical power source.

8. The method recited in claim 7, wherein the step of individually selecting the gating input of the plurality of semiconductor switching devices during a braking mode comprises selecting the gating inputs of only a third group of the plurality of semiconductor switching devices to effectively short-circuit a direct current motor driving said movable equipment, so as to dynamically brake said direct current motor to a halt.

9. The method recited in claim 7, wherein the step of determining the operating mode of the movable equipment includes running operating modes of fast forward, slow forward, fast reverse, and slow reverse operating modes.

10. The method recited in claim 8, wherein said movable equipment has both a forward direction and a reverse direction, and the step of determining the operating mode of the movable equipment includes initiating a soft start and hard stop in the forward direction, and initiating a soft start and hard stop in the reverse direction.

11. A reversible conveyor control and dynamic braking circuit, said circuit having a plurality of operating modes, said circuit comprising:
  (a) an alternating current electrical power source supplying an electrical current, said alternating current approximating a sine wave;
  (b) a reversible direct current motor for driving the conveyor;
  (c) a plurality of semiconductor switching devices individually connected to said alternating current electrical power source, said semiconductor switching devices each containing a gating input, a load-current input, and a load-current output, said semiconductor switching devices directly switching and rectifying said electrical current to said direct current motor, wherein the load-current inputs of said semiconductor switching devices are directly connected to said alternating current electrical power source, and the load-current outputs of said semiconductor switching devices are directly connected to said equipment;
  (d) a first control circuit for determining the operating mode of the conveyor, wherein the operating mode is selected among at least running, braking, and stop modes; and
  (e) a second control circuit for individually selecting the gating input of each of the plurality of semiconductor switching devices at appropriate time intervals to place said semiconductor switching devices in one of a conducting and non-conducting mode, so as to operate said conveyor in one of said operating modes, said second control circuit, during a running mode, selecting the gating inputs of only a first group of the plurality of semiconductor switching devices to conduct and rectify said electrical alternating current to the direct current motor during each positive half-cycle of the sine wave of the alternating current, and selecting the gating inputs of only a second group of the plurality of semiconductor switching devices to conduct and rectify said electrical alternating current to the direct current motor during each negative half-cycle of the sine wave of the alternating current.

12. The reversible conveyor control and dynamic braking circuit as recited in claim 11, wherein said second control circuit comprises means for selecting the gating inputs of a third group of the plurality of semiconductor switching devices to effectively short-circuit said direct current motor, thereby producing a reverse current having a magnitude and a rise-time which dynamically brakes the direct current motor to a halt, without the use of other in-series electrical components to limit the magnitude of said reverse current, and without the use of other in-series electrical components to limit the rise-time of said reverse current.

13. A reversible conveyor control and dynamic braking circuit, said circuit having a plurality of operating modes, said circuit comprising:
(a) an alternating current electrical power source supplying an electrical current, said alternating current approximating a sine wave;
(b) a reversible direct current motor for driving the conveyor;
(c) a plurality of semiconductor switching devices individually connected to said alternating current electrical power source, said semiconductor switching devices each containing a gating input, a load-current input, and a load-current output, said semiconductor switching devices directly switching and rectifying said electrical current to said direct current motor, wherein the load-current inputs of said semiconductor switching devices are directly connected to said alternating current electrical power source, and the load-current outputs of said semiconductor switching devices are directly connected to said equipment;

(d) a first control circuit for determining the operating mode of the conveyor, wherein the operating mode is selected among at least running, braking, and stop modes; and
(e) a second control circuit for individually selecting the gating input of each of the plurality of semiconductor switching devices at appropriate time intervals to place said semiconductor switching devices in one of a conducting and non-conducting mode, so as to operate said conveyor in one of said operating modes, said second control circuit, during a running mode, selecting the gating inputs of only a first group of the plurality of semiconductor switching devices to conduct and rectify said electrical alternating current to the direct current motor during each positive half-cycle of the sine wave of the alternating current, and selecting the gating inputs of only a second group of the plurality of semiconductor switching devices to conduct and rectify said electrical alternating current to the direct current motor during each negative half-cycle of the sine wave of the alternating current, wherein the running operating mode of the conveyor includes fast forward, slow forward, fast reverse, and slow reverse operating modes.

14. The reversible conveyor control and dynamic braking circuit as recited in claim 11, wherein said movable equipment has both a forward direction and a reverse direction, and the operating modes of the conveyor include means for a soft start and hard stop in the forward direction, and a soft start and hard stop in the reverse direction.

15. The reversible conveyor control and dynamic braking circuit as recited in claim 11, wherein the semiconductor switching devices comprise silicon controlled rectifiers.

16. The reversible conveyor control and dynamic braking circuit as recited in claim 11, wherein the semiconductor switching devices comprise transistors.

* * * * *

UNITED STATES PATENT AND TRADEMARK OFFICE
CERTIFICATE OF CORRECTION

PATENT NO. : 5,361,022
DATED : November 1, 1994
INVENTOR(S) : Michael E. Brown

It is certified that error appears in the above-indentified patent and that said Letters Patent is hereby corrected as shown below:

In column 15, line 44, (claim 7), "Operating" should read --operating--

In column 16, line 24, (claim 10), "claim 8", should read --claim 7--

Signed and Sealed this

Seventeenth Day of January, 1995

Attest:

BRUCE LEHMAN

*Attesting Officer*    *Commissioner of Patents and Trademarks*